(12) United States Patent
Manninen

(10) Patent No.: US 8,563,114 B2
(45) Date of Patent: Oct. 22, 2013

(54) INDUSTRIAL FABRIC COMPRISED OF SELECTIVELY SLIT AND EMBOSSED FILM

(75) Inventor: Allan Manninen, Stittsville (CA)

(73) Assignee: Astenjohnson, Inc., Charleston, SC (US)

( * ) Notice: Subject to any disclaimer, the term of this patent is extended or adjusted under 35 U.S.C. 154(b) by 0 days.

(21) Appl. No.: 13/514,704

(22) PCT Filed: Dec. 10, 2010

(86) PCT No.: PCT/CA2010/001956
§ 371 (c)(1),
(2), (4) Date: Jun. 8, 2012

(87) PCT Pub. No.: WO2011/069259
PCT Pub. Date: Jun. 16, 2011

(65) Prior Publication Data
US 2012/0244311 A1     Sep. 27, 2012

(30) Foreign Application Priority Data
Dec. 11, 2009   (CA) ...................................... 2688470

(51) Int. Cl.
*B32B 3/24* (2006.01)
*D21G 9/00* (2006.01)

(52) U.S. Cl.
USPC ............ 428/132; 428/136; 162/289; 162/296

(58) Field of Classification Search
USPC ............................ 428/132, 136; 162/289, 296
See application file for complete search history.

(56) References Cited

U.S. PATENT DOCUMENTS

| | | | | |
|---|---|---|---|---|
| 1,918,149 A | * | 7/1933 | Sullivan | 428/132 |
| 2,043,987 A | * | 6/1936 | Brown | 428/132 |
| 3,097,787 A | * | 7/1963 | Schur | 383/94 |
| 3,121,660 A | | 2/1964 | Hall, Jr. | |

(Continued)

FOREIGN PATENT DOCUMENTS

| | | |
|---|---|---|
| GB | 1 037 003 | 7/1966 |
| GB | 2235705 | 3/1991 |

(Continued)

OTHER PUBLICATIONS

International Search Report & Written Opinion mailed Mar. 2, 2011; PCT/CA2010/001956; International File Date: Dec. 10, 2010; Astenjohnson, Inc.; 8 pages.

*Primary Examiner* — William P Watkins, III
(74) *Attorney, Agent, or Firm* — Schmeiser, Olsen & Watts LLP

(57) ABSTRACT

A nonwoven industrial fabric, and a method of constructing the fabric. The fabric comprises at least one layer of a polymeric film having a plurality of apertures extending from an upper surface through to a lower surface. Adjacent pairs of the apertures define land areas therebetween, and selected land areas comprise protrusions extending from at least one of the upper surface and the lower surface of the layer to form a profile to the respective surface. The method comprises optionally pre-embossing the film, cutting the film to provide the plurality of apertures, applying pressure to selected land areas to form the protrusions to create a contoured profile, and treating the film to set the contoured profile. Additional surface treatment can be provided, and two or more layers can be secured over each other for multilayer fabrics. The invention provides a simplified and economical construction, while maintaining stability and strength.

63 Claims, 17 Drawing Sheets

(56) References Cited

U.S. PATENT DOCUMENTS

| | | |
|---|---|---|
| 4,740,409 A | 4/1988 | Lefkowitz |
| 4,842,794 A | 6/1989 | Hovis et al. |
| 5,207,962 A | 5/1993 | Hovis et al. |
| 5,262,107 A | 11/1993 | Hovis et al. |
| 5,819,811 A | 10/1998 | Baker et al. |
| 5,916,462 A | 6/1999 | James et al. |
| 6,071,837 A | 6/2000 | Crook |
| 6,124,015 A | 9/2000 | Baker et al. |
| 6,436,240 B1 | 8/2002 | Jeffrey |
| 6,531,418 B1 | 3/2003 | Lidar et al. |
| 6,623,586 B2 | 9/2003 | Mortellite et al. |
| 6,700,036 B2 | 3/2004 | Thomas et al. |
| 6,773,786 B1 | 8/2004 | Kuckart |
| 6,989,080 B2 | 1/2006 | Hansen |
| 7,029,264 B2 | 4/2006 | Gray |
| 7,083,843 B2 | 8/2006 | Mizutani et al. |
| 7,303,861 B2 | 12/2007 | Gray et al. |
| 7,323,087 B2 | 1/2008 | Beck |
| 7,589,249 B2 | 9/2009 | Gubernick et al. |
| 7,713,683 B2 | 5/2010 | Gray et al. |
| 7,722,588 B1 | 5/2010 | Johnson et al. |
| 7,815,773 B2 | 10/2010 | Herman et al. |
| 2004/0119208 A1 | 6/2004 | Gray et al. |
| 2006/0280909 A1 | 12/2006 | Kien et al. |
| 2010/0230064 A1 | 9/2010 | Eagles et al. |
| 2010/0236740 A1 | 9/2010 | Mourad et al. |
| 2011/0272112 A1 | 11/2011 | Aberg et al. |
| 2012/0021171 A1 | 1/2012 | Riviere et al. |

FOREIGN PATENT DOCUMENTS

| | | |
|---|---|---|
| JP | 2002113775 | 4/2002 |
| WO | 2011069258 | 6/2011 |
| WO | 2012095251 | 7/2012 |
| WO | 2012123439 A2 | 9/2012 |

* cited by examiner

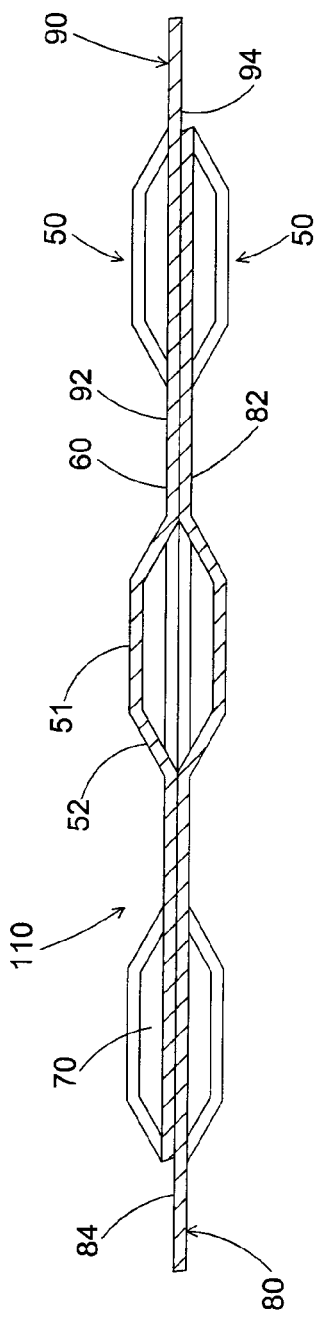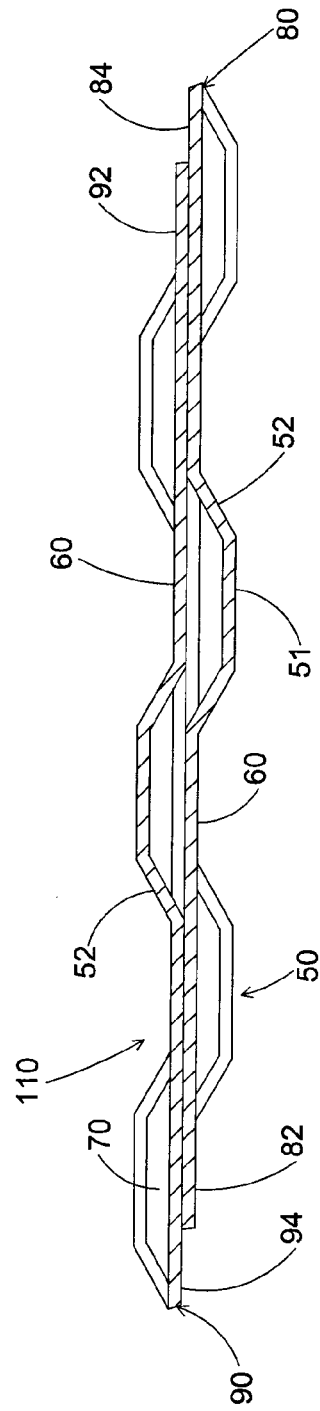
FIGURE 11a
FIGURE 11b

INDUSTRIAL FABRIC COMPRISED OF SELECTIVELY SLIT AND EMBOSSED FILM

FIELD OF THE INVENTION

This invention relates to industrial fabrics for filtration, conveyance and similar purposes, and in particular to such fabrics constructed of one or more layers of a polymer film, to which contouring is provided by a combination of an embossing or similar process to raise portions of the film above its general plane, and slits to create apertures in the raised portions. The fabrics of the invention are useful in a variety of industrial applications, including for filtration and conveyance in papermaking machines, and have particular application for use as dryer fabrics for conveying a paper web through the dryer section of a papermaking machine.

BACKGROUND OF THE INVENTION

Industrial fabrics used in filtration, conveyance and similar processes are typically manufactured by means of a weaving process whereby natural or synthetic yarns are interwoven to provide either the entire fabric, or only a base portion which may subsequently be either encapsulated (e.g. with polyurethane or other similar rugged material) or needled to attach a nonwoven batt material. Such fabrics have been satisfactory for these uses, but the cost of their production is high, particularly when the fabrics must be finely and precisely woven using relatively small yarns. Further, these fabrics must be rendered endless in some manner, either by installing a seaming element at their opposed longitudinal ends, or by re-weaving the longitudinal yarns back into the fabric structure to form seaming loops or similar joining means, for secure connection by a pintle, coil or similar securing means. It is also known to weave such fabrics in an endless manner, so that there is no seam, or to interweave the yarns from one longitudinal end into the yarns of the opposed end to form a woven seam. These fabrics are expensive to produce and require a high capital investment in wide industrial looms and similar related equipment for subsequent processing, as well as a skilled workforce to operate the equipment and produce an acceptable finished product.

It is also known to make these industrial fabrics from film or other continuous media, and to provide perforations, profiling or other treatment prior to assembly. See for example WO 2010/088283, WO 2010/088280, WO 2010/068778, WO 2010/068765, WO 2010/030570, WO 2010/030547 and WO 2010/030298, all commonly assigned to Albany International Corp., which disclose various industrial fabrics formed from a film and which are intended for use in the manufacture of various sheet-like products. In general, the fabrics disclosed in these references are comprised of a film which has been laser drilled for porosity; their surfaces can be patterned to provide grooves or various topographical features, and may also be treated for static dissipation or contamination resistance. The film can be comprised of any thermoplastic however PET is preferred; two or more layers of the same of differing material can be laminated together and reinforcing fibers can be included within the structure.

GB 2,202,873 and GB 2,235,705 (both to Lefkowtiz) disclose paper machine fabrics, in particular press felts, having knuckle-free surfaces which include parallel machine-direction yarns laid in a single plane and subsequently embedded in a sheet of polymeric material such as polyurethane or fluorinated polymers; the sheet, yarns and embedding matrix are then perforated to allow drainage and a batt material may subsequently be attached to one or both surfaces of the resulting textile.

Other paper machine clothing into which a film-like component has been incorporated are described in various patents, for example U.S. Pat. No. 6,071,837 (Crook), U.S. Pat. No. 6,436,240 (Jeffrey), U.S. Pat. No. 6,531,418 (Lidar et al.), U.S. Pat. No. 6,989,080 (Hansen), U.S. Pat. No. 7,323,087 (Beck). It is also known from U.S. Pat. No. 7,029,264, U.S. Pat. No. 7,303,861 and U.S. Pat. No. 7,713,683, all to Gray et al., to provide an apparatus for making a formed polymeric film by passing jets of high pressure water through apertures so as to deform the film. However, the films require the use of reinforcing yarns within the film extrusion.

Other apertured films, and processes for their manufacture, to provide textiles for various industrial applications, are known. For example, U.S. Pat. No. 4,842,794, U.S. Pat. No. 5,207,962, and U.S. Pat. No. 5,262,107 all to Hovis et al., disclose fabrics and processes for forming same including an apertured thermoplastic film which has been deformed by means of a patterned embossing roll. U.S. Pat. No. 6,623,586 (Mortellite et al.) discloses a product and apparatus for lamination of a polymer film into a sheet of web material. U.S. Pat. No. 5,916,462 (James et al.) discloses a method of forming an apertured support member by moving a laser in a series of raster scans over the surface of a workpiece to drill one or more apertures which are surrounded by a plateau. U.S. Pat. No. 6,700,036 (Thomas et al.) discloses an absorbent article including an "acquisition distribution layer" formed from a three dimensional apertured film. U.S. Pat. No. 7,722,588 (Johnson et al.) discloses a multilayered apertured film for use in thermal sealing processes for formation of an absorbent article. U.S. Pat. No. 7,589,249 (Gubernick et al.) discloses an apertured web comprising multiple discrete zones of land arrangements and at least two apertures. JP 2002/113775 (Dai Nippon Printing) discloses a process for producing an uneven plastic sheet including convex lens formations.

However, none of the references noted above discloses a fabric having the advantageous properties of woven fabrics, for industrial filtration and similar uses, and which is constructed from one or more layers of a polymer film which has been contoured by providing a combination of an embossing or similar process to raise portions of the film above its general plane to form protrusions, and slit to create apertures at the raised portions.

It would therefore be highly desirable to provide a simple, relatively less expensive process for the use of such polymer film for the construction of nonwoven fabrics possessing most or all of the advantageous properties of the known woven industrial fabrics, without the disadvantages and cost of the steps required to produce such woven fabrics.

SUMMARY OF THE INVENTION

It has been found that an industrial fabric having desired properties of a woven fabric can be formed from a polymeric film, which is selectively provided with contouring similar to that resulting from various weave designs for woven fabrics, by a combination of an embossing or similar process, generally through heat and pressure, to raise portions or deformations of the film above its general plane, and slits to create apertures in the deformations, for the passage of fluid, e.g. liquid drainage or air passage through the fabric.

It has further been found that other advantages can be obtained by providing multiple layers of such polymeric film. For example, a two layer fabric can be provided in which a first layer of the embossed film is mated with a second layer so that the deformations formed by the embossing process either face or oppose one another. The two layers are secured together by any suitable means, for example by welding. Where each layer of the fabric is itself constructed from a plurality of strips, preferably the joining regions of one layer are offset from those of the other, so that one strip of the film in the first layer overlays a longitudinal butt joint of two similar strips in the second layer. The slit areas between the deformations allow for the passage of fluid, while the deformations maintain an interior space or void between the two layers.

Additional layers can be added, for example a first and second layer can be constructed as described above, and then a third layer secured to the second layer to provide a specific surface profile to the upper surface of the finished fabric. Alternatively, two layers can be joined back to back, so that the deformations of each layer face outwardly.

To prepare the individual strips of film, preferably each strip of the film is precisely slit according to a predetermined pattern in a discontinuous slitting process, and the film material between alternate adjacent slits is then deformed in an embossing process to push the film material out of plane, creating raised areas beneath which openings into the plane are formed. Preferably the embossing process is performed using heat and pressure so that the deformations are permanent. Alternatively, the planar film can be embossed with a preliminary profile, or with the eventual desired profile, and then slits are cut at the required locations, followed by further embossing to complete the desired profile if only a preliminary profile was provided at the first stage.

After preparation of the individual strips, the fabric is then assembled to the desired length and width from a plurality of such processed strips. Preferably, two or more strips are laid side by side so that their longitudinal edges abut. A third strip of film, which has been slit and embossed according to a pattern so as to be matable with embossments in the strips forming the first layer, is laid over the strips of the first layer, with its embossments facing down towards those on the first layer. The second layer is preferably offset from the first layer, by each strip of the second layer being laid over the abutted longitudinal edges so as to overlap a portion of each of two adjacent strips of the first layer. The third strip forming the second layer is then bonded to the first two strips, preferably using a laser or similar heat source. Additional strips are added in the same manner so as to build up the desired length and width of the finished fabric.

The different layers can be formed in either direction of the finished fabric; for example, each of the layers can be formed with the strips oriented in the intended machine direction (MD) of the fabric, or each in the intended cross-machine direction (CD); or one layer can be oriented in the MD, and another in the CD. Where there are more than two layers, any combination of directions can be used, to provide the desired configuration and end properties.

Further, where physical properties are required for the intended end use of the fabric, which are not possessed or sufficiently provided by the film alone, such as an increased absorbency or fiber contact surface, at least one additional nonwoven porous structure (e.g. film, batt, or a layer of nonwoven material) can be provided, by suitable means such as bonding or adhesion, to either or both of the outer surfaces of the single or multiple layer film structures of the invention.

After construction of the selected layers to form the fabric body, the opposing ends of the fabric can be joined by any suitable means to form a continuous belt, for its intended end use. For example, a seaming element, such as disclosed in WO 2010/121360, or as disclosed in CA 2,688,168, can be installed at each of the opposing ends, and the two ends brought together to be joined by suitable means such as a pintle. Alternatively, the ends of the fabric body of the invention can be suitably provided with slits or openings as in the manner described in relation to embodiments disclosed in CA 2,688,168, or may be deformed and cut in the manner described in relation to suitable embodiments disclosed in WO 2010/121360, so that the seaming portion at each end is integrally constructed with the fabric body, and the two prepared fabric body ends can be brought together and joined. As a further alternative, the ends of the fabric body can be bonded together by known means, such as welding.

The film materials used in the fabrics of the invention are any thermoplastic polymers which are suitable for use in the manufacture of industrial textiles, and would have sufficient tensile strength, stability, chemical and hydrolysis resistance to suit the intended end use of the finished fabric. Preferably the film materials would be polymeric films such as are commonly available, for example a bi-axially oriented thermoplastic polymeric film or sheet of which the polymer has been rendered hydrolysis resistant, or is resistant to heat and hydrolysis by its constitution. Appropriate polymeric materials for the film include, but are not limited to, hydrolysis stabilized polyester terephthalate (PET), polybutylene terephthalate (PBT), polyethylene, polyethylene naphthalate (PEN), polypropylene (PP), polyphenylene sulphide (PPS), polyether ether ketone (PEEK) and other polymers such as would be appropriate for use in forming monofilament intended for use in papermachine clothing, such as dryer fabrics and the like. Various nylon polymers, such as polyamide 6, polyamide 6/6, polyamide 6/10 and the like, as well as their copolymers and blends thereof, may also be appropriate materials for use in the film materials for the fabrics of the present invention.

These materials are all suitable for laser welding, a process which is highly desirable for assembling the fabrics of this invention. Other materials which may be used can include non-thermoplastic materials such as polyimides. There are two general types of polyimides. One type, so-called linear polyimides, are made by combining imides into long chains. Aromatic heterocyclic polyimides are the other usual kind, where R' and R" are two carbon atoms of an aromatic ring. Examples of polyimide films include Apical™, Kapton™, UPILEX™, VTEC™ PI, Norton™ TH and Kaptrex™. These materials are not suitable for laser welding, and layers of film or sheet must therefore be joined by means of an adhesive or other suitable bonding methods.

Optionally, films suitable for the invention can include films in which additional yarns have been embedded, to enhance MD or CD strength and stability or abrasion resistance, for example as in U.S. Pat. No. 7,815,773 or U.S. Pat. No. 6,531,418. This can most readily be done at the time of film extrusion, especially with multilayer films. One yarn type that may be especially useful is carbon fiber nanowires or nanofibers; however other small diameter yarns of PET, PPS, PEEK, PEN, PBT, nylon or the like may also be used. Metal wires may also be suitable with some films. The fibers/wires could be embedded into the film extrusion, or between layers of a multilayer film, or they could be laminated to one or both surfaces of the film. If placed on an exterior surface, for example, that surface could then be used on the MS of the resulting fabric to enhance wear resistance and increase fabric life.

Additionally, as discussed further below in relation to the drawings, reinforcing materials such as yarns can be inserted between selected ones of the protrusions, in at least one of the machine direction, the cross-machine direction, or any suitable direction such as a diagonal. Further, as discussed below, such reinforcement materials can at the same time comprise, or contribute to, the joining of lateral edges of adjacent strips of the fabric.

Preferably, and in particular for use as a dryer fabric for papermaking applications, the polymeric film has a gauge of from about 1,000 to 1,400, corresponding to a thickness of from about 0.25 to 0.35 mm. However, other thicknesses of film or sheet may be suitable. Henceforth the term "film" will be used in reference to the film of polymeric material used in the invention. Film whose thickness is greater than about 0.35 mm is referred to as "sheet" in the industry.

The invention therefore seeks to provide a nonwoven industrial fabric, comprising at least one layer of a polymeric film having
(i) an upper surface and a lower surface;
(ii) a plurality of apertures extending from the upper surface through to the lower surface wherein adjacent pairs of the apertures define land areas therebetween, and selected ones of the land areas comprise protrusions extending from at least one of the upper surface and the lower surface of the layer to form a profile to the respective surface.

Each protrusion can extend from one of the upper surface and the lower surface of the layer, and generally preferably each protrusion extends from the same surface of the layer.

Preferably, selected ones of the land areas between pairs of the protrusions comprise planar areas.

In embodiments of the invention, the fabric comprises a plurality of strips secured in an adjacent relationship at joining locations at respective lateral edges.

In one embodiment, the nonwoven industrial fabric comprises a first layer and a second layer of polymeric film, and optionally can comprise a third or more layers. In a first aspect of this embodiment, the lower surface of the first layer comprises a first set of protrusions, the upper surface of the second layer comprises a second set of protrusions, and at least some of the protrusions of the second set are secured to at least some of the protrusions of the first set.

In the first aspect of this embodiment, preferably
(a) the lower surface of the first layer comprises a first set of protrusions;
(b) the upper surface of the second layer comprises a second set of protrusions;
(c) selected ones of the land areas between pairs of the protrusions of each set comprise planar areas;
(d) each protrusion of the first set is received between an adjacent pair of protrusions of the second set, and each protrusion of the second set is received between an adjacent pair of protrusions of the first set; and
(e) at least some of the protrusions of the second set are secured to planar areas of the first layer, and at least some of the protrusions of the first set are secured to planar areas of the second layer.

Optionally, for each layer, each protrusion extends from the same surface of the layer, such that each layer has a first surface profiled by the protrusions and an opposing substantially planar second surface, and the second surface of the first layer is secured to the second surface of the second layer.

In a second aspect of this embodiment, each layer can comprise a plurality of strips secured in an adjacent relationship at joining locations at respective lateral edges. In this aspect, preferably the strips of each layer are secured in an abutting relationship, and the joining locations of the first layer are offset from the joining locations of the second layer. In this aspect, preferably, adjacent strips of each layer are secured together at weld joints.

Optionally, in embodiments of the invention, the fabric further comprises a set of reinforcement strips, each reinforcement strip being secured to selected planar areas between selected ones of the protrusions on at least two adjacent strips of the fabric, or in the case of a multi-layer fabric, on at least two adjacent strips of the respective fabric layer.

Alternatively, the fabric further comprises a set of reinforcement strips, each reinforcement strip passing through selected ones of the protrusions on at least two adjacent strips of the respective fabric layer.

Preferably, the reinforcement strips comprise yarns.

Optionally, the apertures can comprise slits having a configuration in a plane of the upper surface of the film selected from arcuate and linear and combinations thereof. Where the slits have a linear configuration, this can be selected from a straight line and a line comprising a plurality of linear segments.

As a further option, the protrusions can have an outer surface in a plane substantially parallel to a plane of the upper surface of the film, the outer surface having a configuration selected from circular, elliptical and polygonal.

In the nonwoven industrial fabrics of the invention, at least part of at least the upper surface of the film can comprise a surface roughness, preferably comprising between 5 μm and 100 μm.

In embodiments of the invention, the fabric further comprises a fabric body having a first seamable end and a second seamable end, a first seaming element provided at the first seamable end, a second seaming element provided at the second seamable end, the first and second seaming elements being constructed and arranged to be secured together to form a fabric seam. Optionally, at least one of the first seaming element and the second seaming element is integrally constructed with the fabric body at the respective seamable end.

The invention further seeks to provide a method of constructing an industrial nonwoven fabric, the method comprising the steps of
(a) providing at least one layer of a polymeric film having an upper surface and a lower surface;
(b) selectively cutting the film to provide a plurality of apertures extending from the upper surface through to the lower surface to define land areas between adjacent pairs of the apertures;
(c) selectively applying pressure to selected ones of the land areas to form protrusions extending from at least one of the upper surface and the lower surface and to create a contoured profile in the respective surface; and
(d) selectively treating the film to set the contoured profile.

The invention further seeks to provide a method of constructing an industrial nonwoven fabric, the method comprising the steps of
(a) providing at least one layer of a polymeric film having an upper surface and a lower surface;
(b) selectively applying pressure to selected portions of the film to form protruding embossed areas to create a contoured profile in at least one of the upper surface and the lower surface; and
(c) selectively cutting the film adjacent to selected portions of the embossed areas to provide a plurality of apertures extending from the upper surface through to the lower surface and to define land areas between adjacent pairs of the protruding embossed areas; and
(d) selectively treating the film to set the contoured profile.

Optionally, step (a) can comprise providing a polymeric film having a surface roughness treatment to at least part of the upper surface, preferably comprising between 5 µm and 100 µm.

Where at least part of the pressing is performed before the cutting of the film to provide the apertures, preferably the step of applying pressure is performed as an intermediate step to provide intermediate configurations of the protruding embossed areas, and the method further comprises after the cutting step the step of selectively applying pressure to provide final configurations to selected ones of the protruding embossed areas.

In general, preferably the contoured profile comprises protrusions on only one surface of the polymeric film layer.

Preferably, the formation of the contoured profile comprises forming a plurality of planar land areas.

Optionally, the methods of the invention further comprise constructing the fabric as a plurality of strips secured in an adjacent relationship at joining locations at respective lateral edges.

Optionally also, the methods of the invention further comprise providing a first layer and a second layer of polymeric film, and optionally at least a third layer.

In a first aspect of this embodiment, the contoured profile comprises a first set of protrusions on the lower surface of the first layer, a second set of protrusions in the upper surface of the second layer, and the method further comprises the step of securing at least some of the protrusions of the second set to at least some of the protrusions of the first set.

Alternatively, in a second aspect of this embodiment, the contoured profile comprises a first set of protrusions on the lower surface of the first layer, a second set of protrusions in the upper surface of the second layer, and a plurality of planar land areas in each layer, and the method further comprises the steps of
(e) aligning each protrusion of the first set between an adjacent pair of protrusions of the second set, and aligning each protrusion of the second set between an adjacent pair of protrusions of the first set; and
(f) securing at least some of the protrusions of the second set to planar areas of the first layer, and at least some of the protrusions of the first set to planar areas of the second layer.

Alternatively, for each layer, the contoured profile is provided to a respective first surface, an opposing second surface is substantially planar, and the method further comprises securing the second surface of the first layer to the second surface of the second layer.

In the methods of the invention, step (a) can comprise providing each layer as a plurality of strips, and the method further comprises the step of securing the strips in an adjacent relationship at joining locations at respective lateral edges, preferably by securing the strips of each layer in an abutting relationship, and offsetting the joining locations of the first layer from the joining locations of the second layer. In this aspect, preferably, step (d.1) comprises securing the adjacent strips of each layer together at weld joints.

Optionally, the methods of the invention further comprise providing a set of reinforcement strips, and securing each reinforcement strip to selected planar areas between selected ones of the protrusions on at least two adjacent strips of the fabric, or in the case of a multi-layer fabric, on at least two adjacent strips of the respective fabric layer.

Alternatively, the methods of the invention further comprise providing a set of reinforcement strips, and passing each reinforcement strip through selected ones of the protrusions on at least two adjacent strips of the respective fabric layer.

Preferably, the reinforcement strips comprise yarns.

Optionally, the selective cutting of the film can provides slits having a configuration in a plane of the upper surface of the film selected from arcuate and linear and combinations thereof. Where the slits have a linear configuration, this can be selected from a straight line and a line comprising a plurality of linear segments.

As a further option, the pressing provides protrusions having an outer surface in a plane substantially parallel to a plane of the upper surface of the film, the outer surface having a configuration selected from circular, elliptical and polygonal.

Optionally, in the methods of the invention, the industrial fabric comprises a fabric body having a first seamable end and a second seamable end, and the method further comprises providing a first seaming element at the first seamable end, and a second seaming element at the second seamable end, the first and second seaming elements being securable together to form a fabric seam. Optionally, at least one of the first seaming element and the second seaming element with the fabric body at the respective seamable end.

BRIEF DESCRIPTION OF THE DRAWINGS

The invention will now be described with reference to the drawings, in which

FIGS. 11a and 11b are sectional side views of two layers of the fabric of FIG. 1 in two variants of an assembled position in a third embodiment of the invention;

DETAILED DESCRIPTION OF THE DRAWINGS

Figure 1:
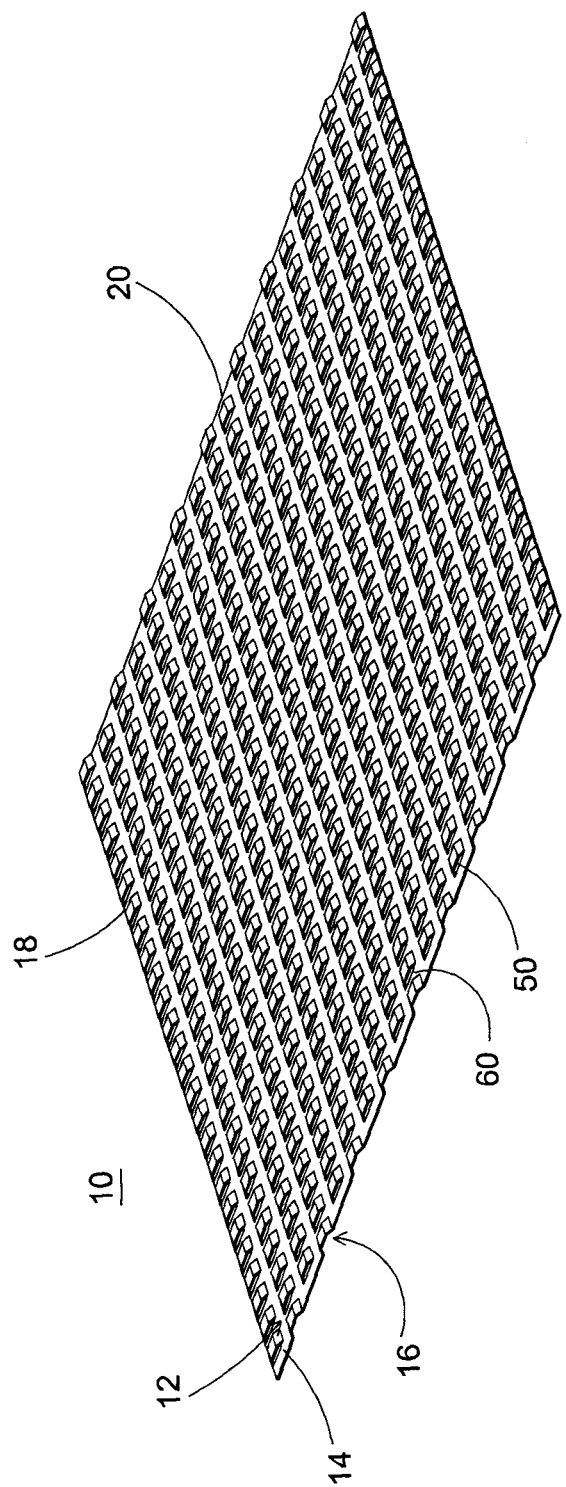
FIG. 1 is a perspective view of one surface of a portion of a fabric in an embodiment of the invention.
Figure 2:
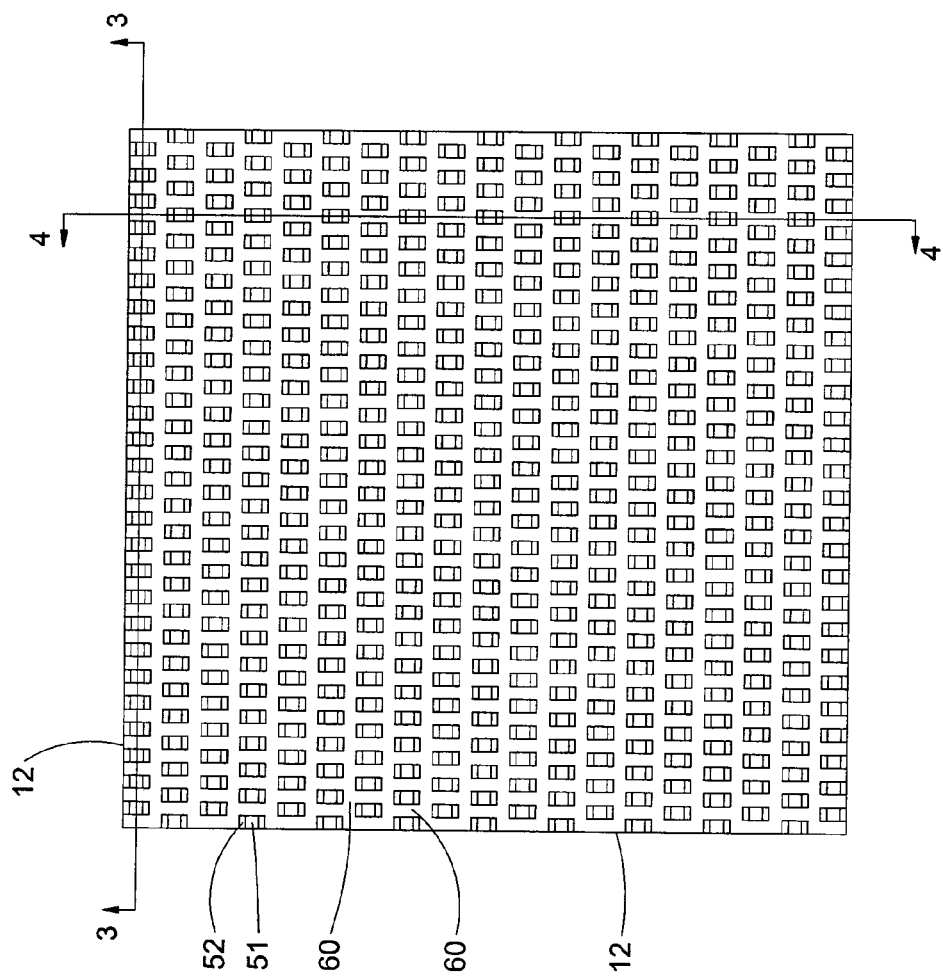
FIG. 2 is a top view of the fabric shown in FIG. 1.

Referring to FIGS. 1 and 2, which are respectively perspective and top views of a first embodiment of the invention, fabric 10 comprises a polymeric film sheet 12, having an upper surface 14 and a lower surface 16 and opposing side edges 20. The fabric 10 can be constructed from one or more elongated strips, or from a plurality of shorter strips, and is shown in FIGS. 1 and 2 as a shorter strip, having opposing ends 18. Where fabric 10 is to be constructed of a plurality of strips, depending on the intended manner of interconnection of the strips, some or all can be provided with planar edge areas (not shown).

A plurality of apertures 40 (see FIG. 5) is provided to the sheet 12, in this embodiment defined by a plurality of slits 30 (see FIG. 7), each of which passes through from the upper surface 14 to the lower surface 16 of the sheet 12. Between selected pairs of adjacent slits 30, the sheet material is pressed to form protrusions 50, in this embodiment in the form of rectangular deformations, each having an upper protrusion surface 51, and remaining attached at each end to the sheet 12 by protrusion sides 52. A plurality of land areas 60 are provided in locations between slits where protrusions are not formed in the sheet material.

Figure 3:
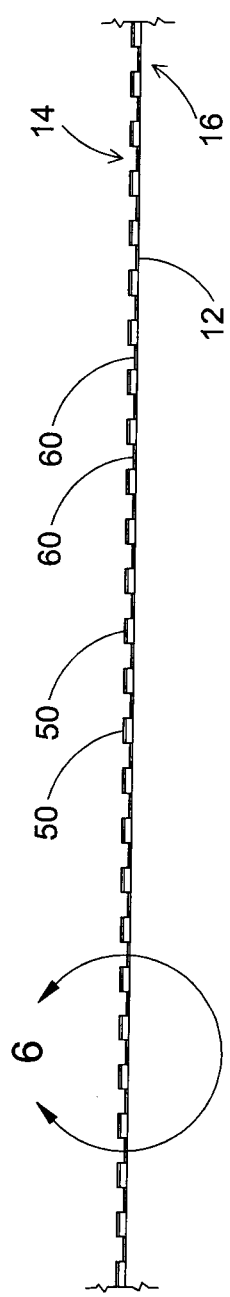
FIG. 3 is a sectional side view of the fabric shown in FIG. 2 taken along the line 3-3.
Figure 4:
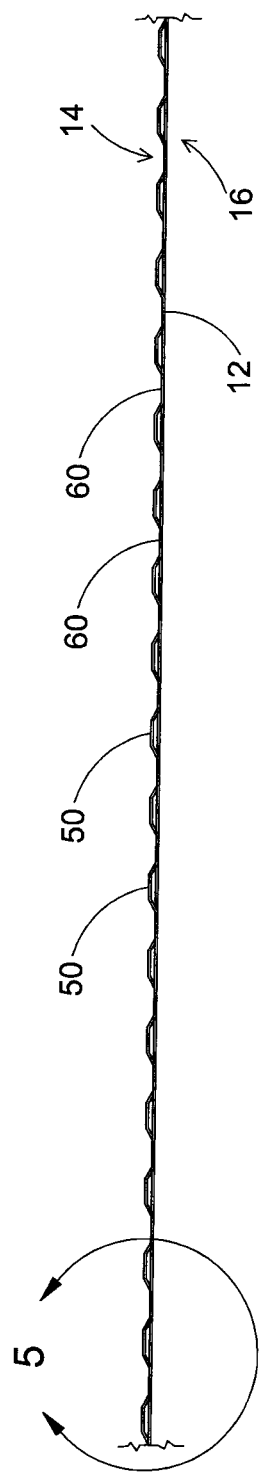
FIG. 4 is a sectional side view of the fabric shown in FIG. 2 taken along the line 4-4.

As can be seen from the cross-sectional views in FIGS. 3 and 4, taken along lines between opposing side edges 20 and opposing ends 18 respectively, the land areas 60 between the protrusions 50 retain a substantially planar configuration.

Figure 5:
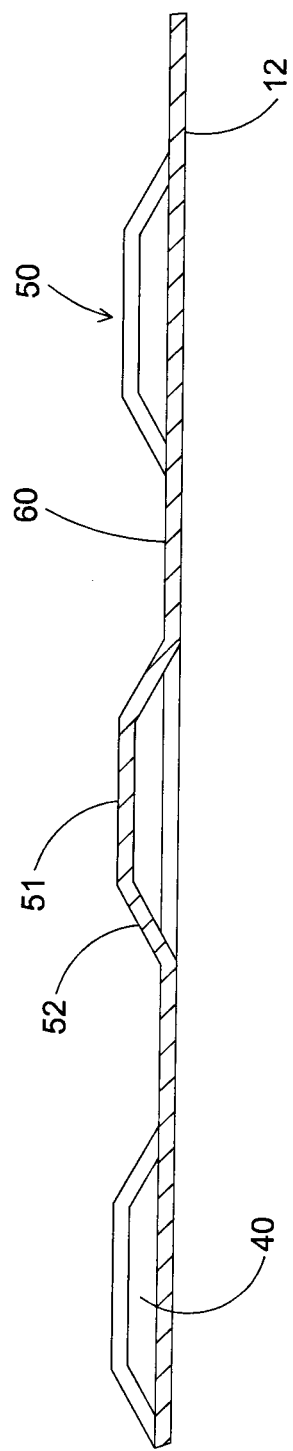
FIG. 5 is an enlarged view of the circled area 5 in FIG. 4.
Figure 6:
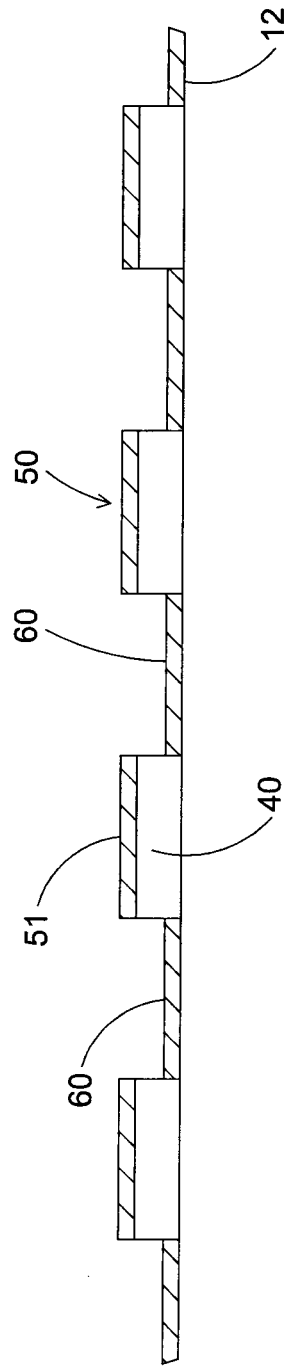
FIG. 6 is an enlarged view of the circled area 6 in FIG. 3.

The configurations of the projections of this embodiment are shown in greater detail in FIGS. 5 and 6. FIG. 5 is an enlarged view from area 5 in FIG. 4, and shows the upper protrusion surfaces 51 of the protrusions 50, and angular protrusion sides 52 connected to the sheet 12, defining apertures 40 within each protrusion 50, and defining land areas 60 between each successive protrusion 50 in the length direction of the sheet 12, i.e. between opposing ends 18. Similarly, FIG. 6 is an enlarged view from area 6 in FIG. 3, and shows the upper protrusion surfaces 51, defining apertures 40 within each protrusion 50, and defining land areas 60 between each successive protrusion 50 in the width direction of the sheet 12, i.e. between opposing edges 20.

Figure 7:
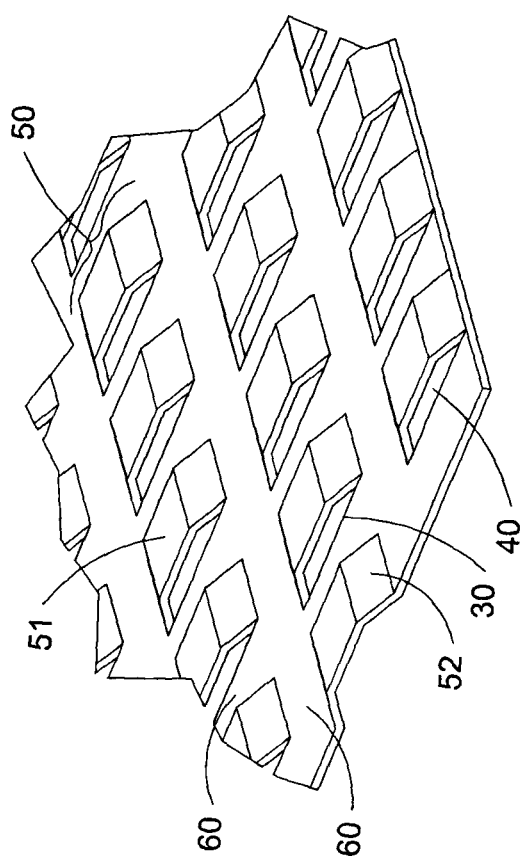
FIG. 7 is an enlarged view of a portion of the fabric of FIG. 1.

FIG. 7 provides an enlarged detailed perspective view of a portion of the fabric 10 of FIG. 1, in which the protrusions 50 can be seen as having substantially planar protrusion upper surfaces 51, and angled sides 52, to define the apertures 40. The protrusion upper surfaces 51 of this embodiment are substantially rectangular, and the slits 30 are substantially linear, defining a regular pattern of rows of protrusions 50, in which the protrusions of one row are offset from the protrusions of adjacent rows in the length direction between opposing ends 18.

In the embodiment shown in FIGS. 1 to 7, the protrusions 50 are provided in a symmetrical pattern, in which each protrusion has the same configuration, and appears only in the upper surface 14 of the sheet 12. However, the slits 30 can be of a variety of shapes, for example a single line, or a complex shape comprising joined linear segments, or symmetrical or asymmetrical curves, resulting in a large variety of possible shapes for the protrusions 50, which need not be identical to each other in a single sheet 12. Further, some of the protrusions can be provided so as to extend from the upper surface 14 and others from the lower surface 16, or a complex shape can be provided so that at least some of the protrusions 50 will individually extend from each of upper and lower surfaces 14, 16. A further material, for example a layer of porous material, can be applied to one or both surfaces, for example by being bonded to the tops of the protrusions 50; alternatively multiple layers could be built up on the surfaces.

Figure 8:
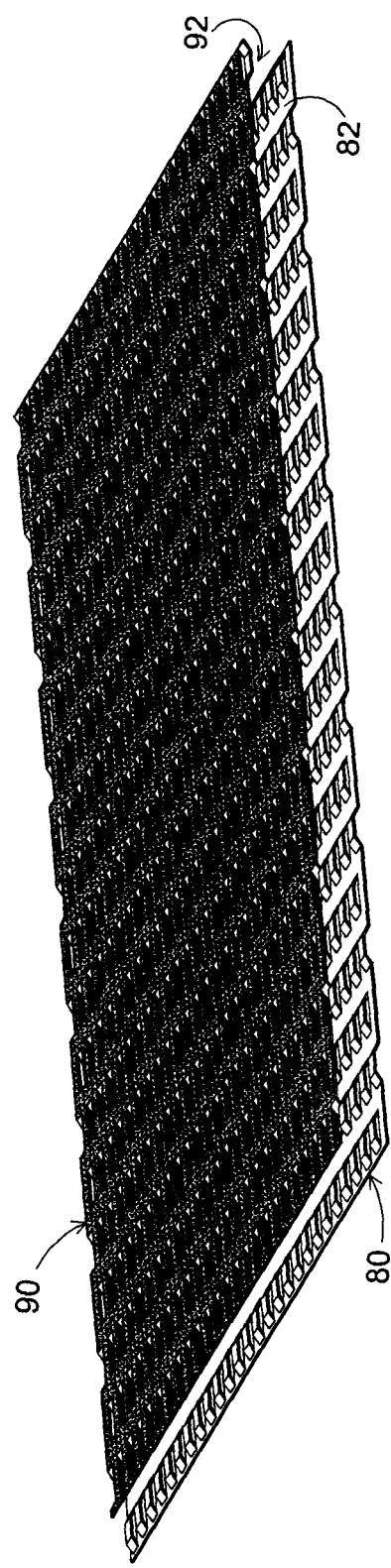
FIG. 8 is a perspective view of two layers of the fabric of FIG. 1 in an assembled position in a second embodiment of the invention.
Figure 9:
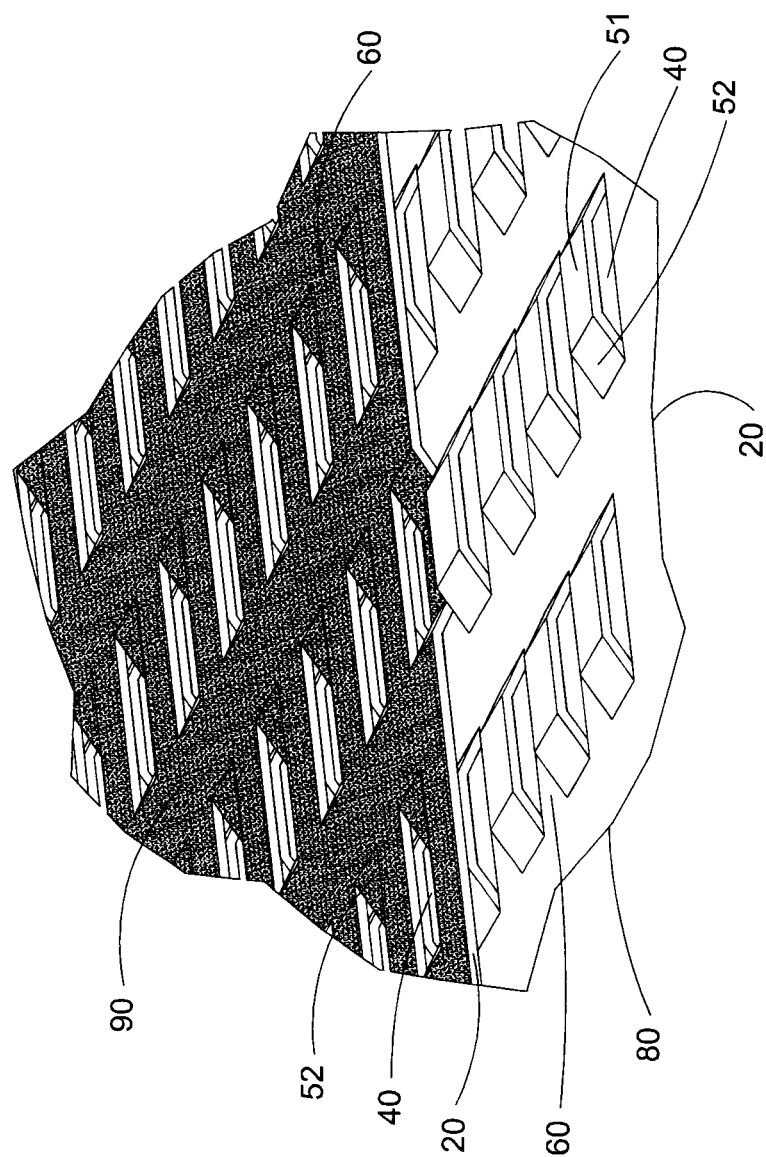
FIG. 9 is an enlarged view of a portion of the fabric shown in FIG. 8.
Figure 10:
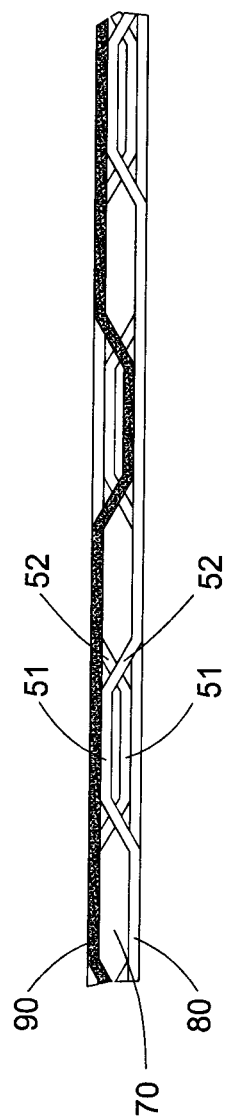
FIG. 10 is a sectional side view of the fabric shown in FIG. 8.

Referring now to FIGS. 8 to 10, a second embodiment of the invention is shown, which comprises a two layer arrangement of a plurality of sheets, each provided with a symmetrical pattern of protrusions having the same general shape as protrusions 50 in the embodiment shown in FIGS. 1 to 7.

Referring to FIG. 8, upper sheet 90 is placed in an offset position in relation to lower sheet 80, so that protrusion-bearing lower surface 92 of upper sheet 90 is over the protrusion-bearing upper surface 82 of lower sheet 80, and protrusions 50 on sheet 90 are located over land areas 60 between protrusions 50 on lower sheet 80, and protrusions 50 on sheet 80 are located under land areas 60 between protrusions 50 on upper sheet 90. As can best be seen from FIGS. 9 and 10, apertures 40 in upper sheet 90 are located between apertures 40 in lower sheet 80, and the two sheets are spaced apart in the direction perpendicular to the their respective planes, to create passages 70 between opposing land areas 60 between the rows of protrusions 50 in the two layers.

In the embodiment of FIGS. 8 to 10, the protrusions 50 are shown as being in symmetrical rows, and spaced apart in such manner that two layer fabrics can be constructed by aligning a plurality of upper sheets 90 and lower sheets 80 to form the layers, and securing them together to provide fabrics of the required final dimensions. In this embodiment, as discussed further below, selected ones of the protrusions of each layer can be secured to land areas of the opposing layer. At abutting edges or ends of the upper sheets 90 or lower sheets 80, the edge areas 22 can be secured together if desired. Alternatively, the securing of the respective protrusions 50 and land areas 60 may be sufficient to retain the respective layers together.

However, as noted above, the protrusions and land areas can be of any suitable shape, location and distribution pattern according to the intended end use of the fabric. For two layer fabrics, the layers can be secured together in any suitable manner, for example by either securing the selected ones of the protrusions 50 of one layer to opposing land areas 60 of the opposing layer, or by securing selected ones of the protrusions 50 of each layer to each other.

As an alternative method of securing the layers together, and referring now to FIGS. 11a and 11b, these sectional side views show two further methods of securing the layers of a two layer fabric 110 in a third embodiment, in which the layers are aligned with their flat (non-protrusion) sides together, so that all the protrusions extend outwardly from the finished fabric. In FIG. 11a, flat lower surface 94 of upper layer 90 is secured over flat upper surface 84 of lower layer 80, so that protrusions 50 in upper layer 90 are aligned over protrusions 50 in lower layer 80, and land areas 60 in upper layer 90 are aligned over land areas 60 in lower layer 80, creating passages 70 between upper layer 90 and lower layer 80. In contrast, in FIG. 11b, lower surface 94 of upper layer 90 is secured over upper surface 84 of lower layer 80 in such manner that protrusions 50 in upper layer 90 are aligned over land areas 60 in lower layer 80, and land areas 60 in upper layer 90 are aligned over protrusions 50 in lower layer 80, thereby creating a different configuration for passages 70 between the two layers. It can be seen that various other configurations can be provided for fabrics of this embodiment, depending on the configuration selected for the protrusions 50 in the strips of each layer 80, 90; but that the two layers can readily be secured to each other so as to provide the required cross-sectional configuration and structure for passages 70.

Figure 12:
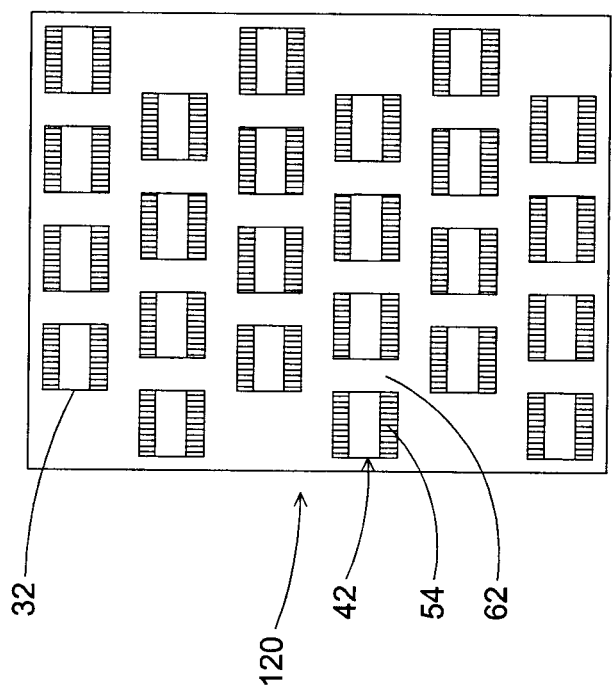
FIG. 12 shows a pattern of a fabric of the invention in a fourth embodiment.

In order to provide a higher open area than in the fabrics shown in FIG. 1 to 10, or 11a, 11b, it may be found preferable to provide for minimal land areas between the protrusions, with the result that the spaces between the protrusions of one layer will not be sufficient to receive the protrusions of a second layer, so that the layers would be secured in an alternative manner. As an example of such fabric, FIG. 12 shows the pattern of a fabric 120 in a fourth embodiment of the invention, in which a high open area is achieved by the use of relatively large protrusions 54, formed from linear slits 32, to create apertures 42, the protrusions 54 being interspaced by relatively small land areas 62.

Alternatively, to provide an increased open area, the film can be selectively perforated, by any appropriate method, such as by laser, so as to provide additional openings in either the land areas or the protrusions, or both, for enhanced air or fluid permeability. Such perforations can be provided at or following film extrusion, or at the time the protrusions and slits are formed, or following fabric assembly.

Figure 13:
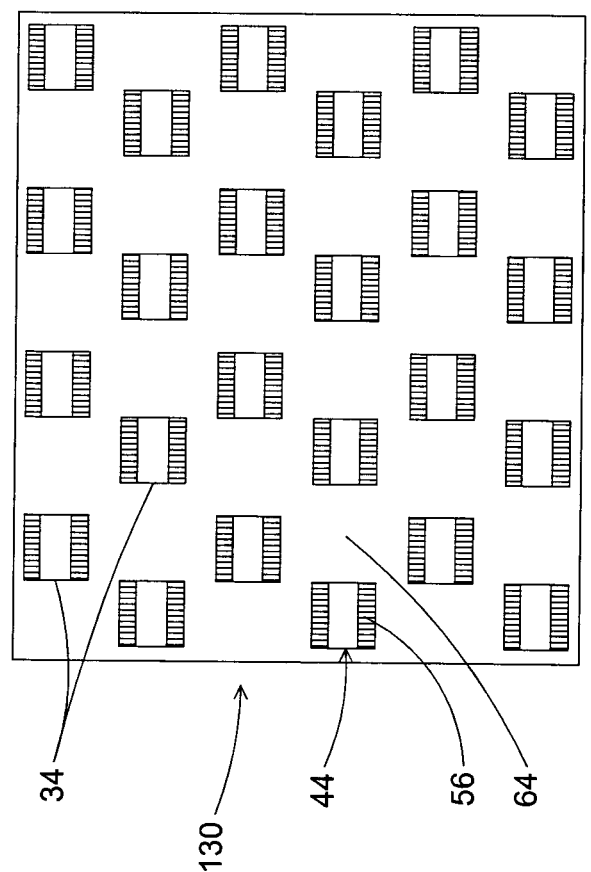
FIG. 13 shows a pattern of a fabric of the invention in a fifth embodiment.

In contrast, a low open area fabric can be constructed by providing for relatively larger land areas between the protrusions. FIG. 13 shows an example of such fabric, in which fabric 130, in a fifth embodiment of the invention, has relatively small protrusions 56 formed from slits 34, to create apertures 44, the protrusions 56 being interspaced by relatively large land areas 64.

Figure 14:
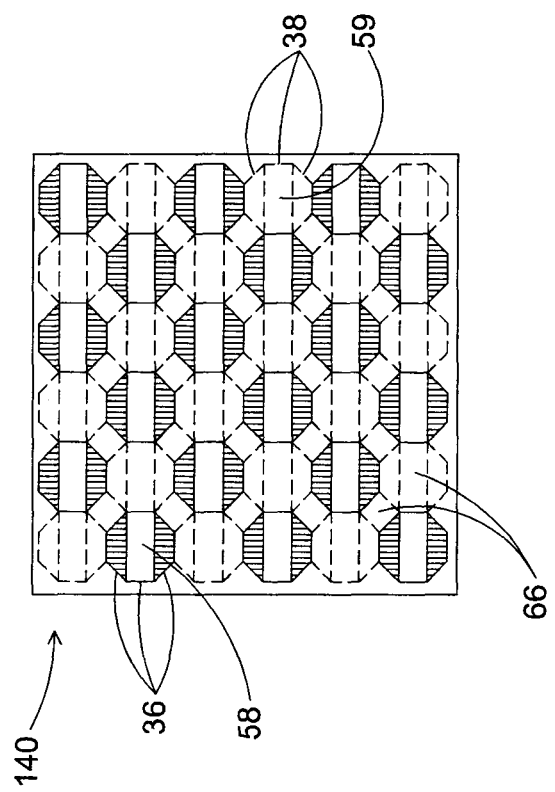
FIG. 14 shows a pattern of a fabric of the invention in a sixth embodiment.

Referring now to FIG. 14, the pattern of a two layer fabric 140 in a sixth embodiment of the invention is shown. In this fabric, the slits 36 comprise linear segments which result in a hexagonal upper surface for each of the protrusions 58, 59 in the respective fabric layers. In this embodiment, the protrusions 58, 59, and land areas 66 are dimensioned such that the protrusions of one layer can be secured between the protrusions of the other layer.

In addition to constructing two layer fabrics as discussed above, further layers can be added as desired, again depending on the intended end use of the fabric. Such additional layers can be of the same, similar or entirely different patterns, and can be affixed to the lower layers by any suitable method such as noted above and discussed further below.

The fabrics of the invention as described above are constructed in the following manner. Where the film is to be slit before any embossing, a supply of film is unwound in the selected length or width direction of the intended fabric from a beam or other supply means. As it is unwound, the film is precisely and discontinuously slit at selected locations across its width and along its length to provide regularly or irregularly arranged incisions across and along the surface of the film. Each incision has a defined length and is precisely located on the film, and passes through the entire thickness of the film to form an opening.

After slitting, the film is subjected to appropriate heat and pressure to provide for selective and precise embossing, or crimping or deformation, according to the selected pattern for the fabric, at locations between and along two adjacent incisions using either opposed plates, embossing rolls or similar means so as to deform the selected portions of the film between pairs of incisions. Either the film, or the embossing means, or both, is heated so as to create at the selected locations a pattern of permanent out-of-plane deformations in the film, which are retained after cooling, and in the intended end use of the fabric. There is a "land" area, or non-embossed region between each deformation in both the MD or length direction, and CD or cross direction. These deformations are preferably arranged in a regular manner so as to allow a second layer of similarly slit and embossed film to be placed on and joined to the first layer, but irregular patterns are also feasible if appropriate for the intended end use of the fabric. Alternatively, as noted above, the film can be pre-embossed, either with a preliminary partial embossing, including various types of surface treatment to provide desired physical properties to the film, as noted below, or with the eventual complete profile, and then the deformed/embossed portions selectively cut to provide the desired pattern of apertures. If the pre-embossing is performed to create only a partial profile, the film can be subjected to a further embossing step after being cut, to produce the intended finished pattern and profile.

To provide improved properties of the surface of the film, such as enhanced contamination resistance, one or both of the film surfaces can also be profiled, etched, or patterned, in addition to the embossing for creation of the protrusions 50. For example, a micro-level patterning can be used to impart very small striations and surface roughness, preferably between 5 µm and 100 µm as described in U.S. Pat. No. 6,773,786 (Kuckart). Alternatively, macro-level patterning can be provided to the exterior film surface to introduce other characteristics into the sheet, such as enhancing sheet bulk.

For constructing a two layer fabric, the second and similarly deformed layer of film can be laid over the first in an offset manner to provide a partial overlap, but aligned so that the out-of-plane deformations of the second film layer either mate with, or are located on the land areas between the deformations of the first film layer. Alternatively, the two film layers can be placed with their flat sides together, i.e. so that after joining of the layers, the out-of-plane deformations of each layer are on the outer exposed surfaces, for example in the embodiment shown in FIGS. 11*a*, 11*b*, which can reduce or eliminate any internal stress in the fabric. Where a fabric is assembled from two or more layers, in use the outer surface must travel a greater distance than the inner surface as it passes around the periphery of curved surfaces such as rolls, which do not all have the same diameter. This causes internal stress in the fabric which may lead eventually to premature delamination. However, in such fabrics, there is a region between the MS surface and the PS surface, that undergoes zero strain when the fabric bends as it is wrapped around the curved surfaces. This region in the fabric, termed the "neutral line" in EP 806519 (para. 0009, line 21), always travels at the same speed regardless of the fabric radius of curvature. The alignment of the two layers with their flat sides together, so that the contact and joining region of the two layers will be at the "neutral line" in the interior of the fabric, enables the protrusions on the two outer surfaces, by reason of their discontinuity, to accommodate the effects of the curvatures without being subjected to the amount of strain to which the more continuous planar surfaces of the flat sides would be subjected if they comprised the outer surfaces of the fabric.

If the deformations of one layer are mated with and bonded to corresponding land areas of the other film layer, as shown in FIG. 10, this will impart a high degree of stability to the structure. It is not necessary, however, that the second film layer be slit and embossed in the same manner as the first. There is a multiplicity of geometric arrangements of the land areas and depressions which can be provided to each of the first and second layers and will allow for compatible alignment.

After alignment of the two film layers in their selected positions, preferably the layers are then bonded together using a laser or similar bonding means. Where the flat sides of the layers are to be placed together, they can be aligned in any manner to provide the required open area, for example as in the embodiment shown in FIGS. 11*a*, 11*b*. Where the surfaces of the respective layers having the out-of-plane deformations are to be placed together, either the deformations of each layer are in contact with and bonded to the corresponding undeformed land areas of the opposing layer; or the deformations of each layer are in contact with and bonded to the deformations of the opposing layer.

In the embodiments of FIGS. 1 to 10, the CD and MD distance across and along a surface of each layer of film between adjacent incisions and deformations is constant so that the deformations of the first layer can be accommodated between those of the second layer and the bonding will be from protrusions 50 (deformation) to land areas 60. In these embodiments, where used as a papermaker's fabric, the CD distance between adjacent incisions will generally be in the range of from about 1.5 to 5.0 mm; more preferably it is from about 2.0 mm to about 3.0 mm. Preferably, the length or MD distance between successive incisions is constant and is from about 2 mm to 5 mm. Each incision is about 5 mm in length. The film is embossed at the strips formed between pairs of adjacent incisions to provide a surface having a preselected surface texture which is permeable to the passage of air and water. In the illustrated embodiment, the embossing process forms a regular deformation in the film, the sides of the deformation being angled at approximately 30° to the plane of the film. The deformation has a flat top surface which is raised about 0.45 mm above the plane of the film. The width of the deformation, corresponding to the distance between the adjacent slits, is 2.5 mm, and is selected to correspond to the width of the undeformed land areas adjacent to the deformation. The flat top of the deformation is thus dimensioned so as to lie flat on the undeformed land area to maximize contact at that point between the first and second layers of film; this in turn maximizes bond strength when the two layers are bonded together such as by laser welding. Also, the deformation is in this embodiment nested between deformations adjacent to the land area, thus bracing this contact point between other raised areas. This serves to increase the overall dimensional stability of the fabric structure as the bracing will resist lateral movement of one layer relative to the other.

In the alignment and joining described above, bonding of the two layers is preferably effected by laser welding. In the embodiment of FIGS. 8 to 10, it is possible to bond the two layers of film together at each and every point where a deformation/protrusion is mated with a land. However, this will not generally be necessary, i.e. bonding may only need to be performed at every second, third, fourth or other point where a protrusion and land area are mated. The number of welds or bonds per unit area required to provide a stable and coherent fabric structure will depend on various physical factors involved, including the properties of the film used, and the intended end use of the fabric. Similarly, in the embodiment of FIGS. 11*a* and 11*b*, the flat sides of the two layers 80, 90 can be bonded at all contact points on their contacting surfaces 94, 84, but it will generally be sufficient to bond the layers at regular intervals along their contacting surfaces 94, 84.

In the embodiment of FIGS. 8 to 10, the fabric can advantageously be assembled from two or more layers of relatively narrow strips of film (e.g. from about 0.25 m to about 1 m in width). Each strip is slit and embossed as described above as it is paid off a back beam and unrolled. A length of strip equal to the length or width of the final fabric is prepared. A second strip is similarly prepared and then laid beside the first so the longitudinal edge of the first is in abutting contact with the second strip. A third strip is then unrolled, slit and embossed in the same manner as the first two, and is laid over the butt join formed between the two (i.e. it is offset laterally in the CD by about 50% of the width of one strip so that it fully covers the join between the first two overlaps). The third strip is preferably oriented so that its deformations (embossments, projections, protrusions, crimps, etc) are facing towards those on the first two strips (see FIG. 9) and are located on the land areas in between those deformations. The two layers (comprised now of strips 1 and 2, plus strip 3 overlapping both 1 and 2 at the butt join) are then exposed to laser light energy and welded together at selected locations to the interior of the now double layer fabric. The resulting fabric is thus comprised of a series of slits through each of the two surface films and to the interior of the structure, and the films themselves are joined together at the projections and troughs. Other suitable locations may be chosen for enhancing the strength of the bond or other properties of the resulting textile. In this arrangement, there is no need to butt weld two adjacent strips (lengths) of the film together to hold them in side-by-side alignment. Because the layers are bonded at the embossments and troughs as they are assembled, the fabric will be coherent and resist any attempt to pull adjacent turns apart or move one layer laterally with respect to the other. The fabric is then further assembled by repeating the above process, continuing until sufficient length or width is built up, with adjustment of the dimensions of selected strips at the edges of the fabric to provide for evenness at the edges.

Figure 15:
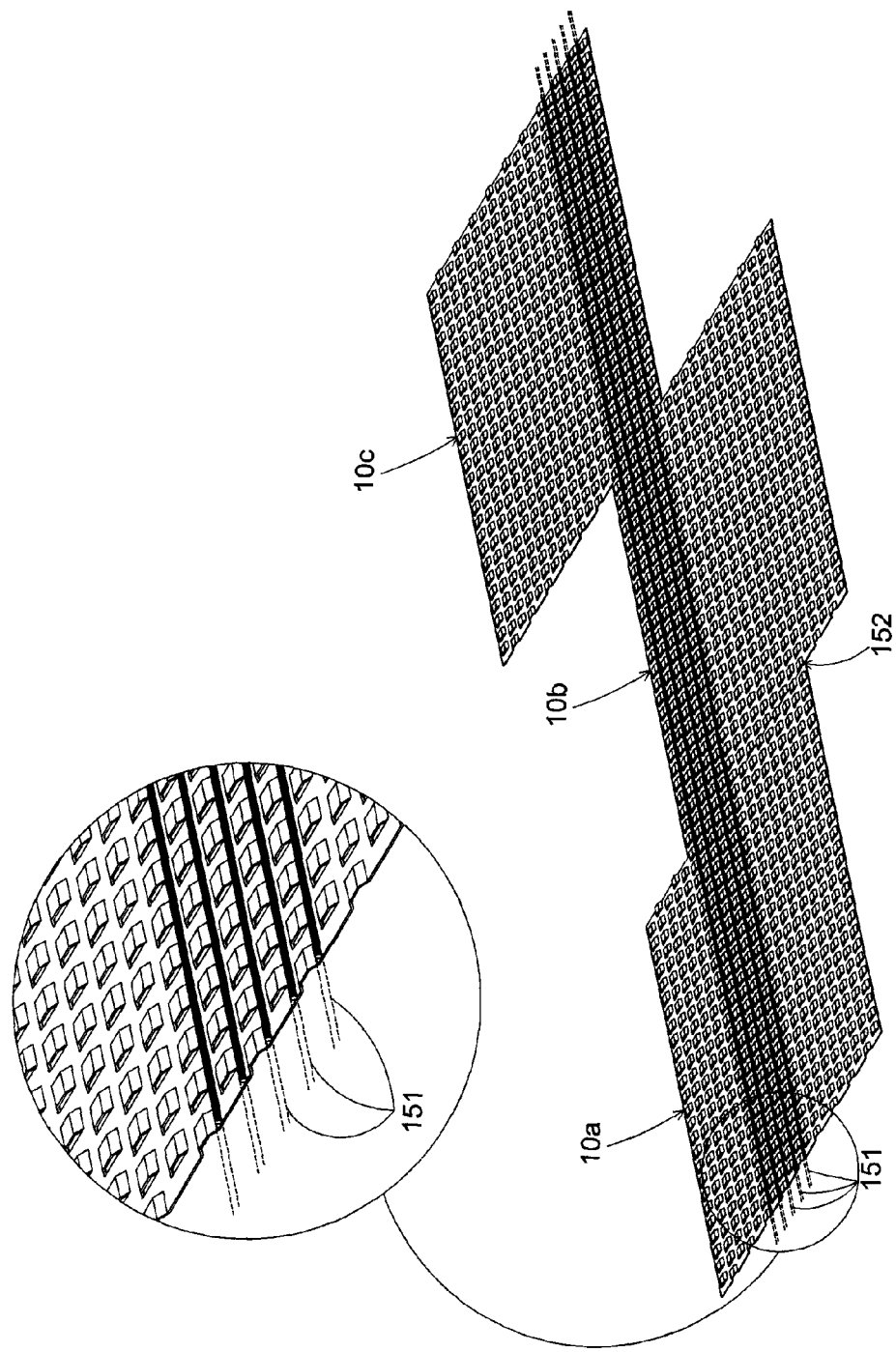
FIG. 15 is a perspective view of three adjacent strips of the fabric assembled together with reinforcing strips in a seventh embodiment of the invention.
Figure 16:
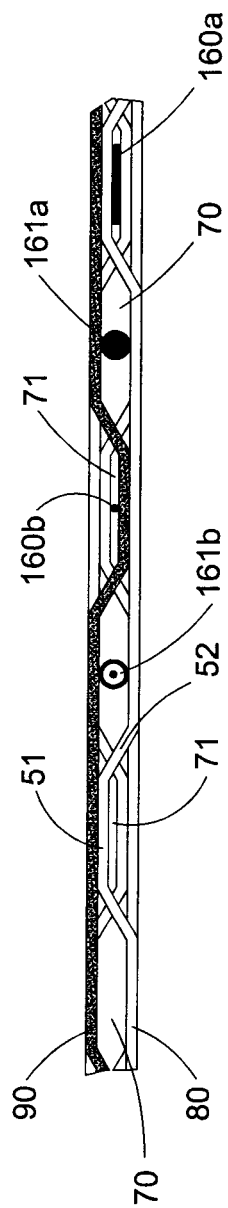
FIG. 16 is a sectional side view of two layers of a fabric of the invention with reinforcing strips in an eighth embodiment of the invention.
Figure 17:
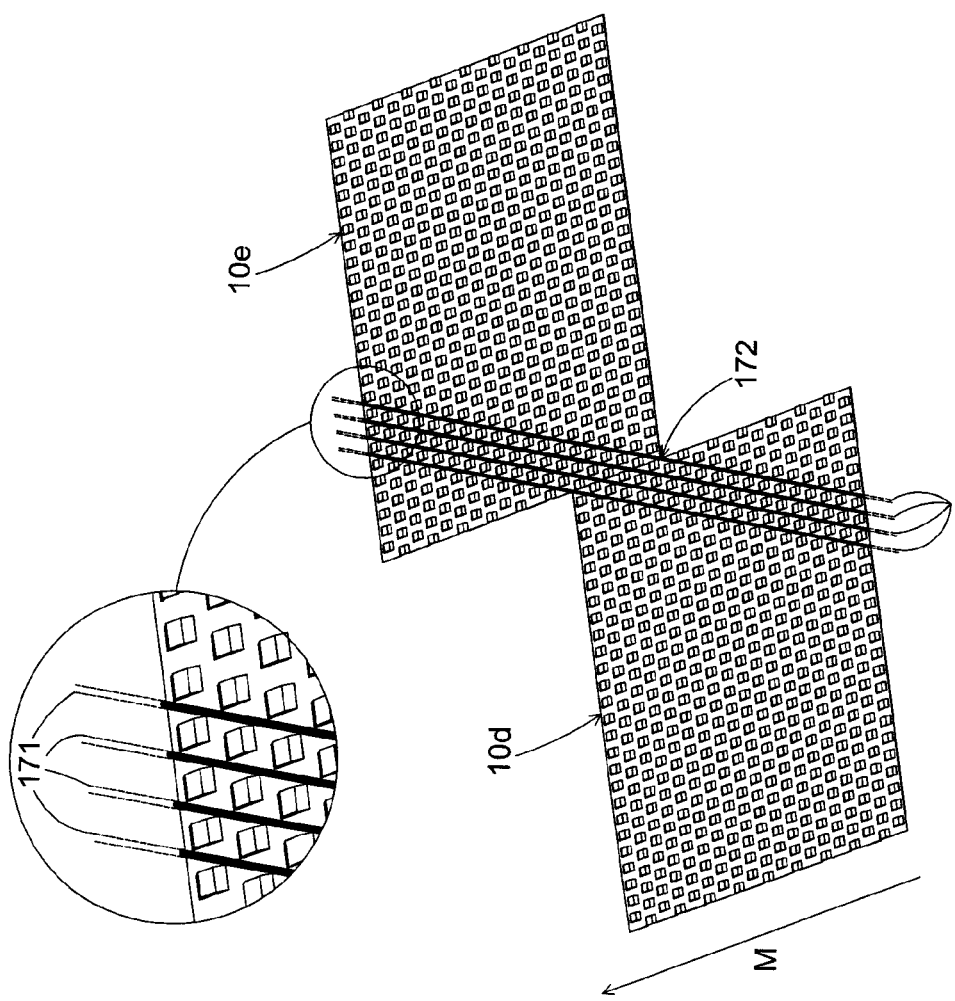
FIG. 17 is a perspective view of two adjacent strips of the fabric assembled together with reinforcing strips in a ninth embodiment of the invention.

Referring now to FIGS. 15 to 17, further embodiments of the fabrics of the invention and their methods of construction are shown.

With reference to FIG. 15, in assembling strips in an adjacent configuration, their lateral edges can be placed in contact, rather than in an overlapping arrangement, for example by providing individual strips of the slit and embossed film, in suitable widths of from as little as 5 cm to 50 cm or as much as 1 m or more, which can be either spirally or annularly wound or laid adjacent to one another to form a single layer fabric structure. The strips, shown here as 10*a*, 10*b* and 10*c*, can be joined to each other along respective lateral edges, by any suitable joining means, such as butt-welding, as at 152. It will generally be preferable to perform this step at the same time as the strips are laid down in adjacent arrangement, but this step can also be performed at a later time.

Either as a reinforcement of the butt join at 152, or as an alternative to performing a welding step along the lateral edges, reinforcing materials such as yarns or other polymeric ribbon like materials 151 can be provided and secured along selected land areas between the protrusions, extending over at least two of the adjacent strips. This serves to secure the strips to each other, and if used as an alternative to a welding step, this can allow for increased flex in the resulting fabric so that it will exhibit properties more like a textile than a more rigid sheet of film when in use.

To secure reinforcing yarns 151 as shown in FIG. 15, the embossed and slit films are aligned adjacent to each other, such that their land areas and protrusions are continuous from one strip to the next adjacent strip, in this embodiment in the cross-machine direction. The yarns or strips are welded or otherwise bonded in place to the land areas by means of suitable adhesives and traverse the butt join at multiple locations along the fabric length. The yarns are preferably dimensioned so that they lie within the land area between the protrusions and do not stand proud of the fabric surface. As the MD distance between adjacent slits in a typical fabric in this embodiment is from about 2 to 5 mm and the corresponding CD distance between adjacent slits is from about 1.5 to 5 mm, and the protrusions are raised about 0.45 mm above the plane of the fabric, the yarns would be sized relative to that available space.

The reinforcing yarns 151 can be laid in all, or only selected ones of the land areas (for example, every second, third, fourth line) and would allow one strip to move or flex relative to another because there is no rigid bond between adjacent strips, but without any undesirable lateral separation. Instead, the individual yarns which now bridge each adjacent strip are used to hold the fabric together, but due to their discrete nature (as opposed to a continuous weld or bond) still allow for some relative but limited movement of the strips.

Similarly, reinforcing yarns 151 can be provided in the same manner to secure or reinforce the connection between adjacent portions of the film in the machine direction. They can also be provided in any direction in which a suitable line is created by adjacent land areas of adjacent film strips, depending on factors including the intended physical properties for the fabric. For example, FIG. 17 shows the provision of reinforcing yarns 171 provided in a diagonal direction to partly adjacent film strips 10*d* and 10*e*.

In the embodiment shown in FIG. 13, reinforcing yarns can be used in the manner exemplified by yarns 151 in FIG. 15, in either or both of the machine direction and the cross-machine direction; alternatively a diagonal arrangement, such as exemplified by yarns 171 in FIG. 17, can be used. Such diagonal arrangement would also be particularly suitable for embodiments such as that shown in FIG. 14. In a structure having two or more layers, where one layer of slit and embossed film is overlaid a second which has a compatible pattern, it is also possible to insert reinforcing materials into channels which are formed when protrusions of one layer rest on or are bonded to the land areas of a second layer.

Referring now to FIG. 16, it can be seen that there can be various options for the insertion of reinforcing materials into the different channels, depending on the structure of the different layers of the film strips, and the configurations of their arrangement together.

In this figure, the arrangement shown provides larger passages 70, alternated with smaller passages 71. Reinforcing materials can be inserted into any selected ones of the passages 70, 71, and the yarns or other reinforcing structures can have any cross-sectional shape depending on the physical properties required for the reinforcements, provided that they are dimensioned so as to fit into the passages without deforming the planarity of the fabric. For example, reinforcement yarn 160*a* is shaped so as to generally fill one of the passages 71, whereas reinforcement yarn 160*b* has a substantially circular cross-section and can also be inserted in one of the passages 71. Similarly, reinforcement yarn 161*a* is a larger sized yarn which can be inserted into passages 70; and larger yarns of various cross-sectional shapes, for example similar to yarn 160*a*, can readily be inserted into passages 70.

Yarns having the shape of any of yarns 160*a*, 160*b* and 161*a*, or any other shape compatible with the configuration of passages 70, 71, or other passages resulting from the particular structure and arrangement of the strips forming a two or more layer fabric, can be secured in place by any suitable bonding or similar means, such as laser bonding, or by an adhesive.

The reinforcement yarns for each of these embodiments shown in FIGS. 15 to 17 can be monofilaments, multifilaments, spun yarns, hollow yarns and the like such as are known and used in the industrial textile arts.

For the embodiments comprising two or more layers of film, suitable yarns include bi-component yarns, known and used in the industrial textile industry, and shown in FIG. 16 as 161*b*. Such yarns comprise an inner core material having a first melt point, and an outer sheath material having a second melt point which is lower than the first. Following yarn insertion, the fabric can then be heat treated to a temperature at which the sheath material will melt and flow, thereby bonding the yarn 161*b* in place, which contributes still further to the integrity of the fabric, while conforming its shape to that of the passageway 70.

After completion of the assembly process for the layers of strips, the opposing ends of the fabric can then be prepared for seaming, for example by the installation, at each end of the fabric, of mutually compatible connectable components of a polymeric seam element, as noted above.

I claim:

1. A nonwoven industrial fabric for a conveyor in an industrial process, the fabric comprising:
    at least a first layer and a second layer of polymeric film, each layer having
       (i) an upper surface and a lower surface;
       (ii) a plurality of apertures extending from the upper surface through to the lower surface wherein edges of adjacent pairs of the apertures define land areas therebetween, and selected ones of the land areas comprise protrusions extending from at least one of the upper surface and the lower surface of the layer to form a profile to the respective surface, and wherein each protrusion being constructed and arranged to define and at least partly extend over one of the apertures and to provide a flow path from at least one adjacent land area to and through the aperture, wherein
    (a) the lower surface of the first layer comprises a first set of the protrusions;
    (b) the upper surface of the second layer comprises a second set of the protrusions;
    (c) selected ones of the land areas between pairs of the protrusions of each set comprise planar areas;
    (d) each protrusion of the first set is received between an adjacent pair of protrusions of the second set, and each protrusion of the second set is received between an adjacent pair of protrusions of the first set; and
    (e) at least some of the protrusions of the second set are secured to planar areas of the first layer, and at least some of the protrusions of the first set are secured to planar areas of the second layer.

2. A nonwoven industrial fabric according to claim 1, wherein each protrusion extends from the same surface of the layer.

3. A nonwoven industrial fabric according to claim 1, wherein the fabric comprises a plurality of strips secured in an adjacent relationship at joining locations at respective lateral edges.

4. A nonwoven industrial fabric according to claim 1, further comprising at least a third layer.

5. A nonwoven industrial fabric according to claim 1, wherein the lower surface of the first layer comprises a first set of protrusions, the upper surface of the second layer comprises a second set of protrusions, and at least some of the protrusions of the second set are secured to at least some of the protrusions of the first set.

6. A nonwoven industrial fabric according to claim 1, wherein
    at least some of the protrusions of the second set are secured to planar areas of the first layer, and at least some of the protrusions of the first set are secured to planar areas of the second layer.

7. A nonwoven industrial fabric according to claim 1, wherein for each layer, each protrusion extends from the same surface of the layer, such that each layer has a first surface profiled by the protrusions and an opposing substantially planar second surface, and the second surface of the first layer is secured to the second surface of the second layer.

8. A nonwoven industrial fabric according to claim 1, wherein each layer comprises a plurality of strips secured in an adjacent relationship at joining locations at respective lateral edges.

9. A nonwoven industrial fabric according to claim 8, wherein the strips of each layer are secured in an abutting relationship, and the joining locations of the first layer are offset from the joining locations of the second layer.

10. A nonwoven industrial fabric according to claim 8, wherein adjacent strips of each layer are secured together at weld joints.

11. A nonwoven industrial fabric, for conveying in an industrial process, the fabric comprising at least one layer of polymeric film, each layer having
   (i) an upper surface and a lower surface;
   (ii) a plurality of apertures extending from the upper surface through to the lower surface wherein edges of adjacent pairs of the apertures define land areas therebetween, and selected ones of the land areas comprise protrusions extending from at least one of the upper surface and the lower surface of the layer to form a profile to the respective surface, each protrusion being constructed and arranged to define and at least partly extend over one of the apertures and to provide a flow path from at least one adjacent land area to and through the aperture; wherein
   (a) the fabric comprises a plurality of strips secured in an adjacent relationship at joining locations at respective lateral edges, and
   (b) the fabric further comprises a set of reinforcement strips, each reinforcement strip being secured to selected planar areas between selected ones of the protrusions on at least two adjacent strips of the fabric.

12. A nonwoven industrial fabric for conveying in an industrial process, the fabric comprising at least one layer of polymeric film, each layer having
   (i) an upper surface and a lower surface;
   (ii) a plurality of apertures extending from the upper surface through to the lower surface wherein edges of adjacent pairs of the apertures define land areas therebetween, and selected ones of the land areas comprise protrusions extending from at least one of the upper surface and the lower surface of the layer to form a profile to the respective surface, each protrusion being constructed and arranged to define and at least partly extend over one of the apertures and to provide a flow path from at least one adjacent land area to and through the aperture; wherein
   (a) the fabric comprises a plurality of strips secured in an adjacent relationship at joining locations at respective lateral edges, and
   (b) the fabric further comprises a set of reinforcement strips, each reinforcement strip being secured to selected planar areas between selected ones of the protrusions on at least two adjacent strips of the respective fabric layer.

13. A nonwoven industrial fabric for conveying in an industrial process, the fabric comprising a first layer and a second layer of polymeric film, each layer having
   (i) an upper surface and a lower surface;
   (ii) a plurality of apertures extending from the upper surface through to the lower surface wherein edges of adjacent pairs of the apertures define land areas therebetween, and selected ones of the land areas comprise protrusions extending from at least one of the upper surface and the lower surface of the layer to form a profile to the respective surface, each protrusion being constructed and arranged to define and at least partly extend over one of the apertures and to provide a flow path from at least one adjacent land area to and through the aperture; wherein the fabric further comprises a set of reinforcement strips, each reinforcement strip passing through selected ones of the protrusions on at least two adjacent strips of the respective fabric layer.

14. A nonwoven industrial fabric according to claim 11, wherein the reinforcement strips comprise yarns.

15. A nonwoven industrial fabric according to claim 1, wherein the apertures comprise slits having a configuration in a plane of the upper surface of the film selected from arcuate and linear and combinations thereof.

16. A nonwoven industrial fabric according to claim 15, wherein the slits have a linear configuration selected from a straight line and a line comprising a plurality of linear segments.

17. A nonwoven industrial fabric according to claim 1, wherein the protrusions have an outer surface in a plane substantially parallel to a plane of the upper surface of the film, the outer surface having a configuration selected from circular, elliptical and polygonal.

18. A nonwoven industrial fabric according to claim 1, wherein at least part of at least the upper surface of the film further comprises a surface roughness.

19. A nonwoven industrial fabric according to claim 18, wherein the surface roughness comprises between 5 µm and 100 µm.

20. A nonwoven industrial fabric according to claim 1, comprising a fabric body having a first seamable end and a second seamable end, a first seaming element provided at the first seamable end, a second seaming element provided at the second seamable end, the first and second seaming elements being constructed and arranged to be secured together to form a fabric seam.

21. A nonwoven industrial fabric according to claim 20, wherein at least one of the first seaming element and the second seaming element is integrally constructed with the fabric body at the respective seamable end.

22. A method of constructing an industrial nonwoven fabric for conveying in an industrial process, the method comprising the steps of
   (a) providing a first layer and a second layer of a polymeric film, each layer having an upper surface and a lower surface;
   (b) selectively cutting the film to provide a plurality of slits extending from the upper surface through to the lower surface to define land areas between adjacent pairs of the slits;
   (c) selectively applying pressure to selected ones of the land areas to form protrusions extending from at least one of the upper surface and the lower surface and to create a contoured profile in the respective surface and a plurality of apertures, wherein each protrusion defines and at least partly extends over one of the apertures to provide a flow path from at least one adjacent land area to and through the aperture;
   (d) selectively treating the film to set the contoured profile, wherein the contoured profile comprises a first set of protrusions on the lower surface of the first layer, a second set of protrusions in the upper surface of the second layer, and a plurality of planar land areas in each layer;
   (e) aligning each protrusion of the first set between an adjacent pair of protrusions of the second set, and aligning each protrusion of the second set between an adjacent pair of protrusions of the first set; and
   (f) securing at least some of the protrusions of one of the first set and the second set to opposing planar land areas of the respective one of the second layer and the first layer.

23. A method of constructing an industrial nonwoven fabric for a conveyor in an industrial process, the method comprising the steps of (a) providing at least a first and a second layer of a polymeric film each layer having an upper surface and a lower surface;

(b) selectively applying pressure to selected portions of the film to form protruding embossed areas to create a contoured profile in at least one of the upper surface and the lower surface; and (c) selectively cutting each layer of the film adjacent to selected portions of the embossed areas to provide a plurality of apertures extending from the upper surface through to the lower surface wherein edges of the apertures define land areas between adjacent pairs of the protruding embossed areas such that each protruding embossed area defines and at least partly extends over one of the apertures to provide a flow path from at least one adjacent land area to and through the aperture;

(d) selectively treating the film to set the contoured profile, wherein the contoured profile comprises a first set of protrusions on the lower surface of the first layer, a second set of protrusions in the upper surface of the second layer, and a plurality of planar land areas in each layer;

(e) aligning each protrusion of the first set between an adjacent pair of protrusions of the second set, and aligning each protrusion of the second set between an adjacent pair of protrusions of the first set; and (f) securing at least some of the protrusions of one of the first set and the second set to opposing planar land areas of the respective one of the second layer and the first layer.

24. A method according to claim 22, wherein step (a) comprises providing a polymeric film having a surface roughness treatment to at least part of the upper surface.

25. A method according to claim 24, wherein the surface roughness comprises between 5 μm and 100 μm.

26. A method according to claim 25, wherein step (b) is performed to provide intermediate configurations of the protruding embossed areas, and the method further comprises after step (c) the step of (c.1) selectively applying pressure to provide final configurations to selected ones of the protruding embossed areas.

27. A method according to claim 22, wherein the contoured profile comprises protrusions on only one surface of the polymeric film layer.

28. A method according to claim 22, further comprising constructing the fabric as a plurality of strips secured in an adjacent relationship at joining locations at respective lateral edges.

29. A method according to claim 22, wherein step (a) further comprises providing at least a third layer.

30. A method according to claim 22, wherein the securing in step (f) comprises securing at least some of the protrusions of the second set to planar areas of the first layer, and at least some of the protrusions of the first set to planar areas of the second layer.

31. A method according to claim 22, wherein step (a) comprises providing each layer as a plurality of strips, and the method further comprises the step of (d.1) securing the strips in an adjacent relationship at joining locations at respective lateral edges.

32. A method according to claim 31, wherein step (d.1) comprises securing the strips of each layer in an abutting relationship, and offsetting the joining locations of the first layer from the joining locations of the second layer.

33. A method according to claim 31, wherein step (d.1) comprises securing the adjacent strips of each layer together at weld joints.

34. A method of constructing an industrial nonwoven fabric for conveying in an industrial process, the method comprising the steps of (a) providing at least one layer of a polymeric film having an upper surface and a lower surface;

(b) selectively cutting the film to provide a plurality of slits extending from the upper surface through to the lower surface to define land areas between adjacent pairs of the slits;

(c) selectively applying pressure to selected ones of the land areas to form protrusions extending from at least one of the upper surface and the lower surface and to create a contoured profile in the respective surface and a plurality of apertures, wherein each protrusion defines and at least partly extends over one of the apertures to provide a flow path from at least one adjacent land area to and through the aperture;

(d) selectively treating the film to set the contoured profile;

(e) constructing the fabric as a plurality of strips secured in an adjacent relationship at joining locations at respective lateral edges; and (f) providing a set of reinforcement strips, and securing each reinforcement strip to selected planar areas between selected ones of the protrusions on at least two adjacent strips of the fabric.

35. A method of constructing an industrial nonwoven fabric for conveying in an industrial process, the method comprising the steps of:

(a) providing at least a first layer and a second layer of a polymeric film each layer having an upper surface and a lower surface;

(b) selectively cutting the film to provide a plurality of slits extending from the upper surface through to the lower surface to define land areas between adjacent pairs of the slits;

(c) selectively applying pressure to selected ones of the land areas to form protrusions extending from at least one of the upper surface and the lower surface and to create a contoured profile in the respective surface and a plurality of apertures, wherein each protrusion defines and at least partly extends over one of the apertures to provide a flow path from at least one adjacent land area to and through the aperture;

(d) selectively treating the film to set the contoured profile; and (e) providing a set of reinforcement strips, and securing each reinforcement strip to selected planar areas between selected ones of the protrusions on at least two adjacent strips of the respective fabric layer.

36. A method of constructing an industrial nonwoven fabric for conveying in an industrial process, the method comprising the steps of (a) providing at least a first layer and a second layer of a polymeric film each layer having an upper surface and a lower surface;

(b) selectively cutting the film to provide a plurality of slits extending from the upper surface through to the lower surface to define land areas between adjacent pairs of the slits;

(c) selectively applying pressure to selected ones of the land areas to form protrusions extending from at least one of the upper surface and the lower surface and to create a contoured profile in the respective surface and a plurality of apertures, wherein each protrusion defines and at least partly extends over one of the apertures to provide a flow path from at least one adjacent land area to and through the aperture;

(d) selectively treating the film to set the contoured profile; and (e) providing a set of reinforcement strips, and passing each reinforcement strip through selected ones of the protrusions on at least two adjacent strips of the respective fabric layer.

37. A nonwoven industrial fabric according to claim 34, wherein the reinforcement strips comprise yarns.

38. A method according to claim 22, wherein the selective cutting of the film provides slits having a configuration in a plane of the upper surface of the film selected from arcuate and linear and combinations thereof.

39. A method according to claim 38, wherein the slits have a linear configuration selected from a straight line and a line comprising a plurality of linear segments.

40. A method according to claim 22, wherein the pressing provides protrusions having an outer surface in a plane substantially parallel to a plane of the upper surface of the film, the outer surface having a configuration selected from circular, elliptical and polygonal.

41. A method according to claim 22, wherein the industrial fabric comprises a fabric body having a first seamable end and a second seamable end, and the method further comprises providing a first seaming element at the first seamable end, and a second seaming element at the second seamable end, the first and second seaming elements being securable together to form a fabric seam.

42. A method according to claim 41, wherein the step of providing the first seaming element and the second seaming element includes integrally constructing at least one of the first seaming element and the second seaming element with the fabric body at the respective seamable end.

43. A nonwoven industrial fabric according to claim 12, wherein the reinforcement strips comprise yarns.

44. A method according to claim 23, wherein step (a) comprises providing a polymeric film having a surface roughness treatment to at least part of the upper surface.

45. A method according to claim 44, wherein the surface roughness comprises between 5 µm and 100 µm.

46. A method according to claim 23, wherein step (b) is performed to provide intermediate configurations of the protruding embossed areas, and the method further comprises after step (c) the step of (c.1) selectively applying pressure to provide final configurations to selected ones of the protruding embossed areas.

47. A method according to claim 23, wherein the contoured profile comprises protrusions on only one surface of the polymeric film layer.

48. A method according to claim 23, further comprising constructing the fabric as a plurality of strips secured in an adjacent relationship at joining locations at respective lateral edges.

49. A method according to claim 23, wherein step (a) further comprises providing at least a third layer.

50. A method according to claim 23, wherein the securing in step
(f) comprises securing at least some of the protrusions of the second set to planar areas of the first layer, and at least some of the protrusions of the first set to planar areas of the second layer.

51. A method according to claim 23, wherein step (a) comprises providing each layer as a plurality of strips, and the method further comprises the step of (d.1) securing the strips in an adjacent relationship at joining locations at respective lateral edges.

52. A method according to claim 51, wherein step (d.1) comprises securing the strips of each layer in an abutting relationship, and offsetting the joining locations of the first layer from the joining locations of the second layer.

53. A method according to claim 52, wherein step (d.1) comprises securing the adjacent strips of each layer together at weld joints.

54. A method of constructing an industrial nonwoven fabric for conveying in an industrial process, the method comprising the steps of (a) providing at least one layer of a polymeric film having an upper surface and a lower surface;

(b) selectively applying pressure to selected portions of the film to form protruding embossed areas to create a contoured profile in at least one of the upper surface and the lower surface; and (c) selectively cutting the film adjacent to selected portions of the embossed areas to provide a plurality of apertures extending from the upper surface through to the lower surface wherein edges of the apertures define land areas between adjacent pairs of the protruding embossed areas such that each protruding embossed area defines and at least partly extends over one of the apertures to provide a flow path from at least one adjacent land area to and through the aperture;

(d) selectively treating the film to set the contoured profile;

(e) constructing the fabric as a plurality of strips secured in an adjacent relationship at joining locations at respective lateral edges; and (f) providing a set of reinforcement strips, and securing each reinforcement strip to selected planar areas between selected ones of the protrusions on at least two adjacent strips of the fabric.

55. A method of constructing an industrial nonwoven fabric for conveying in an industrial process, the method comprising the steps of (a) providing at least a first layer and a second layer of a polymeric film each layer having an upper surface and a lower surface;

(b) selectively applying pressure to selected portions of the film to form protruding embossed areas to create a contoured profile in at least one of the upper surface and the lower surface; and (c) selectively cutting the film adjacent to selected portions of the embossed areas to provide a plurality of apertures extending from the upper surface through to the lower surface wherein edges of the apertures define land areas between adjacent pairs of the protruding embossed areas such that each protruding embossed area defines and at least partly extends over one of the apertures to provide a flow path from at least one adjacent land area to and through the aperture;

(d) selectively treating the film to set the contoured profile; and (e) providing a set of reinforcement strips, and securing each reinforcement strip to selected planar areas between selected ones of the protrusions on at least two adjacent strips of the respective fabric layer.

56. A method of constructing an industrial nonwoven fabric for conveying in an industrial process, the method comprising the steps of (a) providing at least a first layer and a second layer of a polymeric film each layer having an upper surface and a lower surface;

(b) selectively applying pressure to selected portions of the film to form protruding embossed areas to create a contoured profile in at least one of the upper surface and the lower surface; and (c) selectively cutting the film adjacent to selected portions of the embossed areas to provide a plurality of apertures extending from the upper surface through to the lower surface wherein edges of the apertures define land areas between adjacent pairs of the protruding embossed areas such that each protruding embossed area defines and at least partly extends over one of the apertures to provide a flow path from at least one adjacent land area to and through the aperture;

(d) selectively treating the film to set the contoured profile; and (e) providing a set of reinforcement strips, and passing each reinforcement strip through selected ones of the protrusions on at least two adjacent strips of the respective fabric layer.

57. A nonwoven industrial fabric according to claim 54, wherein the reinforcement strips comprise yarns.

58. A method according to claim 23, wherein the selective cutting of the film provides slits having a configuration in a plane of the upper surface of the film selected from arcuate and linear and combinations thereof.

59. A method according to claim 58, wherein the slits have a linear configuration selected from a straight line and a line comprising a plurality of linear segments.

60. A method according to claim 23, wherein the pressing provides protrusions having an outer surface in a plane substantially parallel to a plane of the upper surface of the film, the outer surface having a configuration selected from circular, elliptical and polygonal.

61. A method according to claim 23, wherein the industrial fabric comprises a fabric body having a first seamable end and a second seamable end, and the method further comprises providing a first seaming element at the first seamable end, and a second seaming element at the second seamable end, the first and second seaming elements being securable together to form a fabric seam.

62. A method according to claim 61, wherein the step of providing the first seaming element and the second seaming element includes integrally constructing at least one of the first seaming element and the second seaming element with the fabric body at the respective seamable end.

63. A nonwoven industrial fabric according to claim 1, wherein each protrusion extends from at least one of the upper surface and the lower surface of the layer.

* * * * *